United States Patent [19]

Behrens et al.

[11] Patent Number: 5,027,673
[45] Date of Patent: Jul. 2, 1991

[54] SELF-ADJUSTING GEAR SHIFT LEVER ASSEMBLY

[75] Inventors: William L. Behrens, Lake Orion; Arthur Anderson, Clarkston, both of Mich.

[73] Assignee: Chrysler Corporation, Highland Park, Mich.

[21] Appl. No.: 451,694

[22] Filed: Dec. 18, 1989

[51] Int. Cl.⁵ .................. F16H 59/10; G05G 7/00; F16C 1/22

[52] U.S. Cl. ...................... 74/473 R; 74/470; 74/501.6; 74/522

[58] Field of Search ............. 74/470, 473 R, 501.5 R, 74/501.6, 522

[56] References Cited

U.S. PATENT DOCUMENTS

| | | | |
|---|---|---|---|
| 3,084,567 | 4/1963 | Fitch et al. | 74/522 X |
| 3,546,962 | 12/1970 | Ruhala | 74/502.4 |
| 4,034,622 | 7/1977 | Deck | 74/502.4 X |
| 4,799,400 | 1/1989 | Pickell | 74/502.6 |

Primary Examiner—Allan D. Herrmann
Attorney, Agent, or Firm—Edward P. Barthel

[57] ABSTRACT

A self-adjusting gear shift lever assembly serving as a link in the shift cable connection between the transmission and the shift lever providing a spring preload on the shift cable and fastener means for adjusting backlash and build tolerances in the shift cable. Two embodiments of the assembly each include a relatively rotatably interconnected lever member and clamp plate. One embodiment has a D-shaped opening formed in the clamp plate for being secured to the transmission shift shaft, with the fastener means on the clamp plate and pin means on the lever member for mounting the end of the shift cable, and a tension spring between the lever member and clamp plate. The other embodiment has the D-shaped opening formed in the lever member, with the fastener means on the lever member and the pin mounting means on the clamp plate, and a compression spring between the lever member and clamp plate.

11 Claims, 3 Drawing Sheets

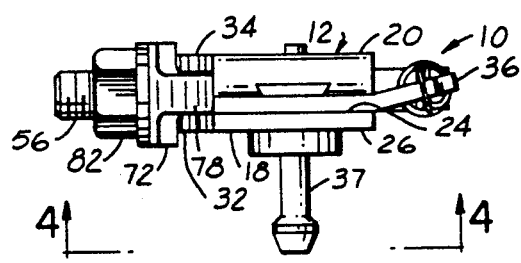
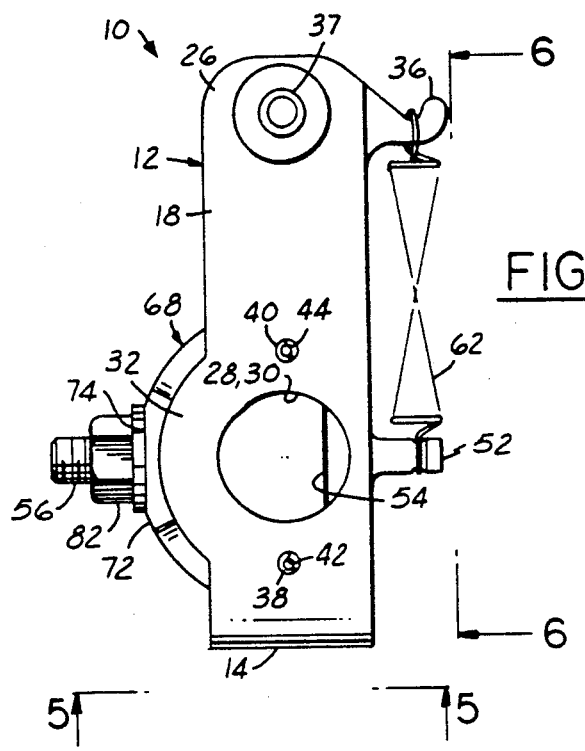
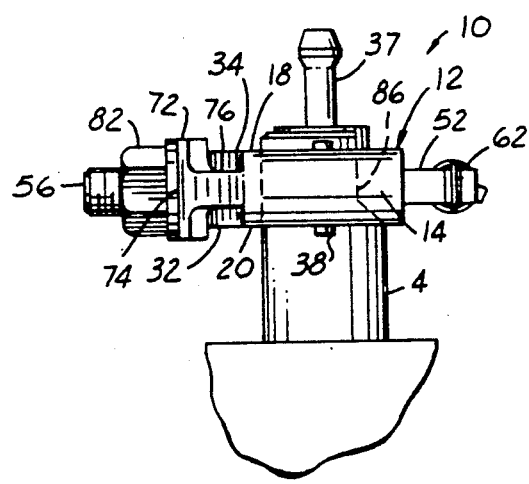
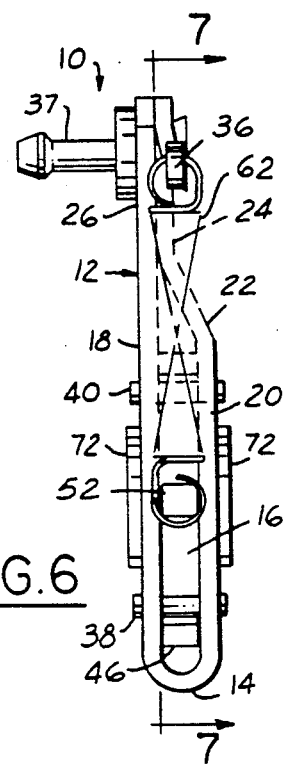
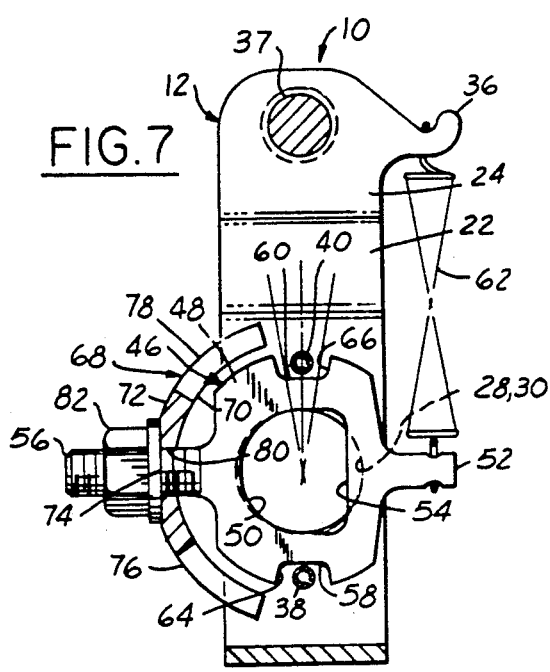

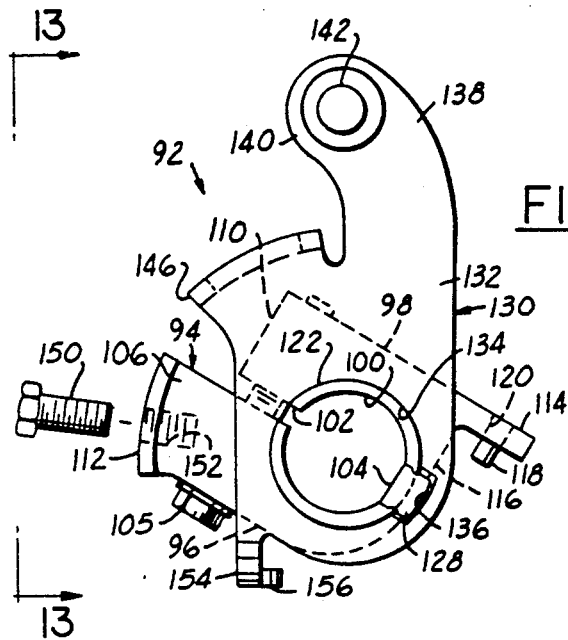
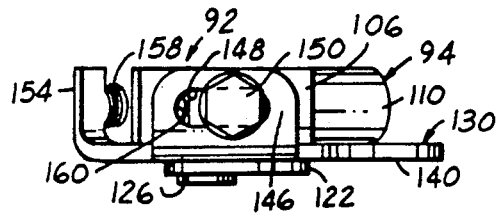
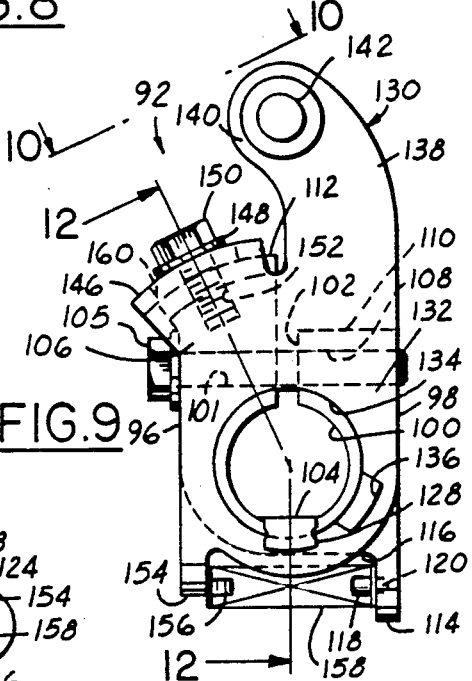
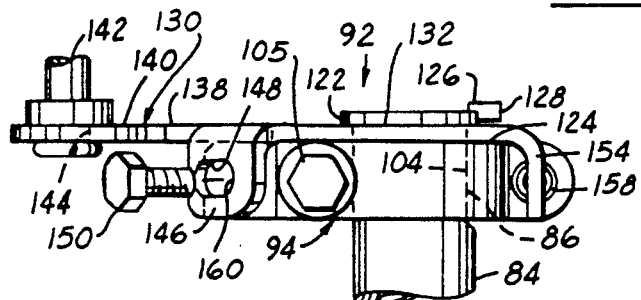
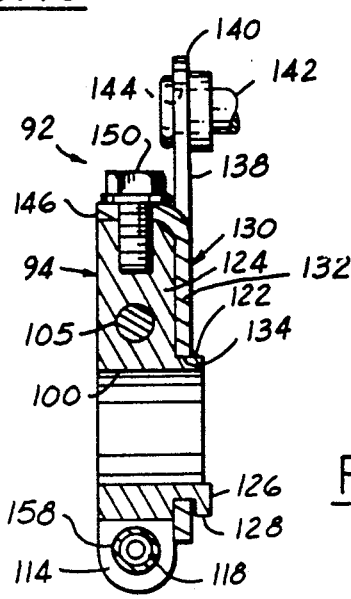
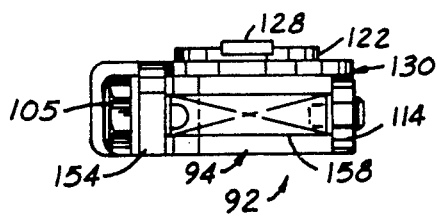

SELF-ADJUSTING GEAR SHIFT LEVER ASSEMBLY

TECHNICAL FIELD

This invention relates generally to automotive gear shift lever assemblies and, more particularly, to such an assembly wherein any backlash in the cable between the gear shift lever inside the vehicle and the transmission shift shaft is self-adjusting.

BACKGROUND ART

Heretofore, to eliminate backlash in a gear shift lever assembly, it has been customary to adjust the conduit or sheath which surrounds the usual cable, in order to eliminate any backlash that may be present in the system. One example of a sheath adjusting lash removal device is shown and described in Ruhala U.S. Pat. No. 3,546,962.

Another known adjustable cable assembly, namely, Deck U.S. Pat. No. 4,034,622, provides adjustment of both the cable and sheath. The sheath includes a threaded coupling member threadedly connected to a rotatable bracket. Rotation of the latter serves to move the coupling member and, hence, the cable and sheath. A lock nut retains the adjusted setting of the bracket and coupling member.

Still another known self-adjusting cable control device is disclosed in Pickell U.S. Pat. No. 4,799,400. In this arrangement, when an adjustment needs to occur because of slack, a spring urges a toothed member connected to a cable to move so as to cause frustoconical surfaces to engage to lift toothed collet members out of engagement with the toothed member until the slack in the cable is removed and the teeth re-engage at a new position.

DISCLOSURE OF THE INVENTION

A general object of the invention is to provide an improved self-adjusting gear shift lever assembly for the linkage intermediate the transmission and the gear shift lever inside the vehicle.

Another object of the invention is to provide an improved self-adjusting gear shift lever assembly which mounts on the transmission shift shaft and serves to adjust for any backlash in the usual shift cable connected between the lever assembly and the usual gear shift lever inside the vehicle.

Still another object of the invention is to provide a self-adjusting gear shift lever assembly for an automotive shift cable, including relatively rotatably interconnected lever and clamp plate members, including spring means for providing a preload on the shift cable and fastening means for interlocking the lever and clamp plate members when the force of the spring and the length of the cable reach an equilibrium relationship.

A still further object of the invention is to provide a self-adjusting automotive gear shift lever assembly serving as a link in the shift cable connection between the transmission and the operator's shift lever, including relatively rotatably interconnected lever and clamp plate members, one of which includes a D-shaped opening for connecting on the transmission shift shaft, and one of which includes pin means for securing an end of the shift cable, and the other of which includes fastening means adaptable to interlock the lever and clamp plate members, and spring means operatively interconnected between the latter members serving to preload the shift cable and to urge the pin means of one member and the fastening means of the other member apart to thereby permit the length of the shift cable and the force of the spring means to attain an equilibrium relationship before resecuring the fastening means.

Still another object of the invention is to provide two alternative embodiments of the self-adjusting gear shift lever assembly wherein one embodiment has the D-shaped opening and fastening means formed on the clamp plate, the pin means formed on the lever, with a tension spring operative between the lever and the clamp plate, while the other embodiment has the D-shaped opening and the fastening means formed on the lever, the pin means formed on the clamp plate, with a compression spring operative between the lever and the clamp plate.

These and other objects and advantages will become more apparent when reference is made to the following drawings and the related description.

BRIEF DESCRIPTION OF THE DRAWINGS

FIG. 3 is an end view of the inventive gear shift lever assembly;

FIG. 4 is a side elevation view of the FIG. 3 structure, taken along the plane of the line 4—4 and looking in the direction of the arrows;

FIG. 5 is an end view of the FIG. 4 structure, taken along the plane of the line 5—5 and looking in the direction of the arrows;

FIG. 6 is an end view of the FIG. 4 structure, taken along the plane of the line 6—6 and looking in the direction of the arrows;

FIG. 7 is a cross-sectional view of the FIG. 6 structure, taken along the plane of the line 7—7 and looking in the direction of the arrows;

FIG. 8 is a side-elevational view of an alternate embodiment of the inventive gear shift lever assembly in the assembling condition;

FIG. 9 is a side elevational view of the FIG. 8 structure in its completely assembled condition;

FIG. 10 is an end view of the FIG. 9 structure, taken along the plane of the line 10—10 and looking in the direction of the arrows;

FIG. 11 is an end view of the FIG. 9 structure, taken along the plane of the line 11—11 and looking in the direction of the arrows;

FIG. 12 is a cross-sectional view of the FIG. 9 structure, taken along the plane of the line 12—12 and looking in the direction of the arrows; and FIG. 13 is an end view of the FIG. 8 structure, taken along the plane of the line 13—13 and looking in the direction of the arrows.

BEST MODE OF CARRYING OUT THE INVENTION

Figure 1:
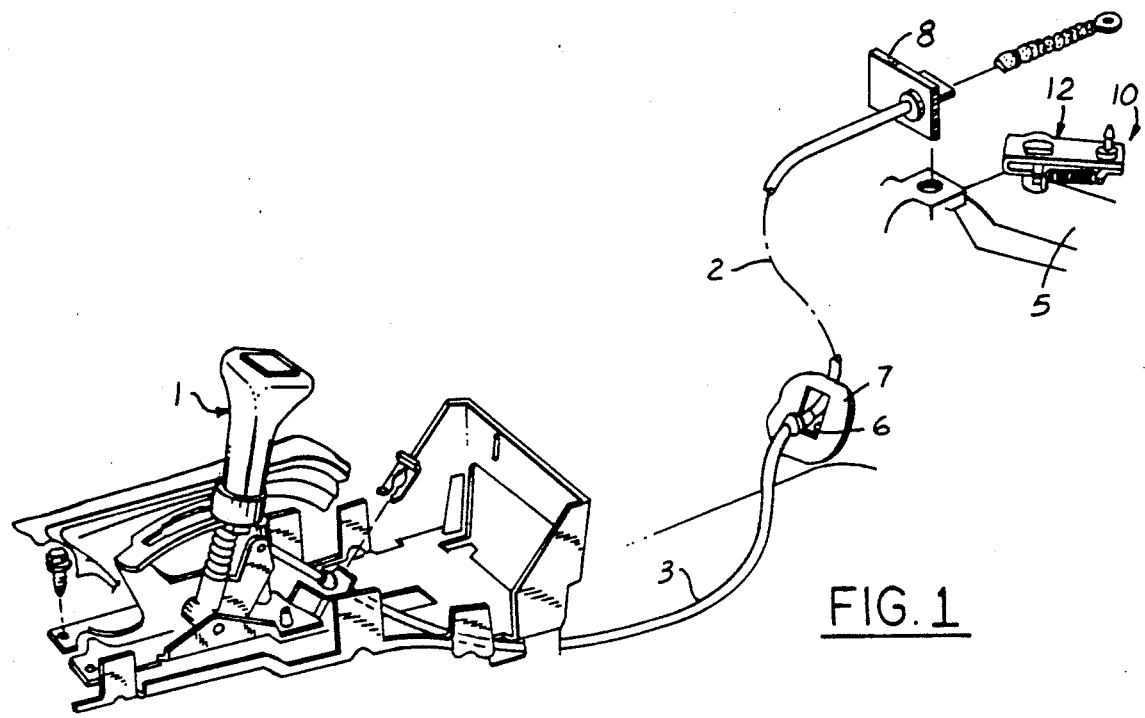
FIG. 1 is a schematic representation of a floor-mounted gear shift lever operatively connected to a transmission via a cable within a sheath and a gear shift lever assembly embodying the invention.
Figure 2:
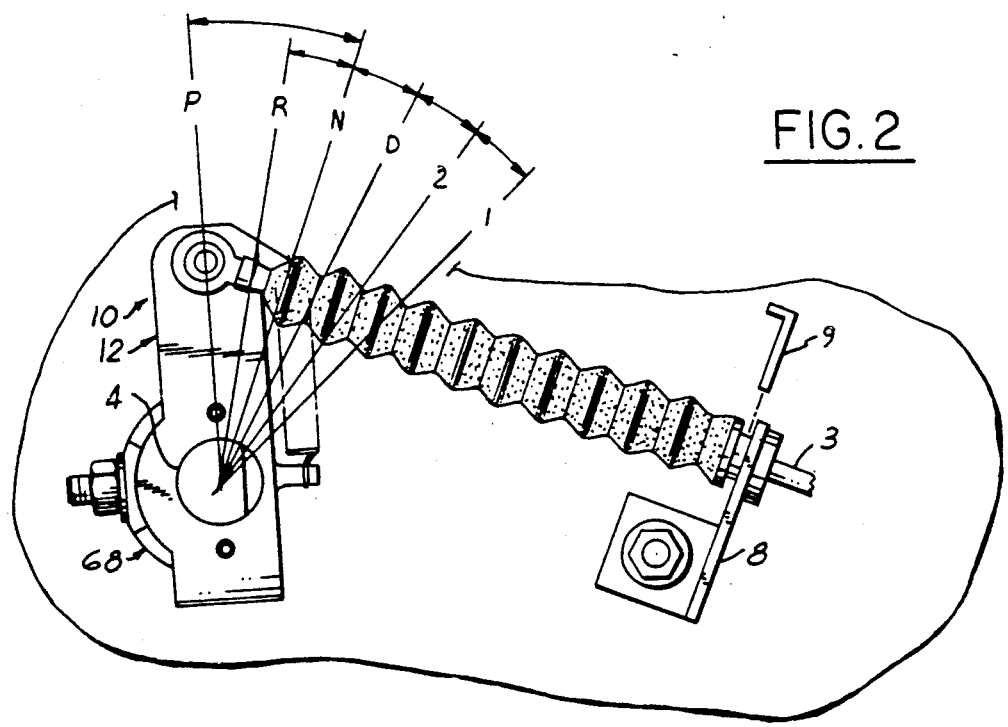
FIG. 2 an enlarged fragmentary portion of the FIG. 1 structure.

Referring now to the drawings in greater detail, FIGS. 1 and 2 illustrate generally a floor mounted gear shift lever 1 inside the vehicle serving to actuate a shift cable core 2 connected thereto and extending within a flexible sheath or conduit 3 through an opening 6 formed in the fire wall 7 and, thence, through a suitable fixed bracket 8 and clip 9 to an end portion of a self-adjusting gear shift lever assembly 10 mounted on a shift shaft 4 (FIG. 2) extending from the transmission represented as 5 (FIG. 1). Selective movement of the shift lever 1 serves to actuate the shift cable 2 to thereby rotate the shift shaft 4 through the usual P, R, N, D, 2 and 1 transmission gear settings (FIG. 2).

FIGS. 3-7 illustrate the self-adjusting gear shift lever assembly 10 including a lever member 12 folded at a center portion 14 so as to form a space 16 between parallel side walls 18 and 20, with the side wall 20 thereof having a bend portion 22 (FIG. 6) bending toward the side wall 18, and a flat end extension 24 abutting against the adjacent distal end portion 26 of the side wall 18. Aligned substantially circular openings 28 and 30 (FIG. 4) are formed through mid-points of the spaced parallel side walls 18 and 20. Arcuate, oppositely disposed edge portions 32 and 34 (FIGS. 3 and 4) are formed on the respective side walls 18 and 20 adjacent the openings 28 and 30. A spring retainer finger 36 is formed on the edge of the flat end extension 24 (FIG. 7). A combined rivet and shift cable pin 37 is secured in a suitable opening means formed through the distal end portion 26 and serves to secure the end portions 24 and 26 together and extend outwardly from the side wall 18.

A pair of pins 38 and 40 (FIG. 6) are secured in respective aligned openings 42 and 44 formed through the side walls 18 and 20 on opposite sides of the openings 28 and 30.

A clamp plate 46 (FIG. 7) is formed to include a body portion 48 having a central D-shaped opening 50 formed therein, with a spring retainer finger 52 formed to extend from the body portion 48 adjacent the flat portion 54 of the D-shaped opening 50, and a threaded member 56 formed to extend from the body portion 48 in direction directly opposite the finger 52. A pair of oppositely disposed notches 58 and 60 are formed in the edges of the body portion 48 intermediate the finger 52 and the threaded member 56. When assembled within the space 16, the notches 58 and 60 are wider than the diameter of, and fit around, the pins 38 and 40, respectively, and the D-shaped opening 50 is substantially aligned with and between the circular openings 28 and 30.

An adjusting coil spring 62 (FIG. 7) is extended to mount at the ends thereof on the spring retainer fingers 36 and 52. The spring urges the side 64 of the notch 58 toward the pin 38, and the side 66 of the notch 60 toward the pin 40.

A clamp washer 68 (FIG. 7) is formed in the shape of an arch having an arcuate-shaped inner surface 70, a central portion 72 having a flat outer surface 74, and a pair of legs 76 and 78 extending from opposite edges of the central portion 72. The central portion 72 is wider than the width of the spaced side walls 18 and 20 (FIG. 5), and the legs 76 and 78 are slightly narrower than the width of the space 16. An opening 80 [FIG. 7) is formed through the central portion 72 such that the clamp washer 68 is mounted around the threaded member 56 with the inner arcuate-shaped surface 70 of the central portion 72 seated on the arcuate edge portions 32 and 34 (FIG. 4) of the side walls 18 and 20, and the legs 76 and 78 extended into the space 16 between the side walls 18 and 20 (FIGS. 3 and 5) and around the body portion 48 of the clamp plate 46. A fastener, such as a nut and washer 82, is threadedly mounted on the threaded member 56 to seat against the outer flat surface 74 (FIG. 4) of the central portion 72 of the clamp washer 68.

The gear shift lever assembly 10 is adapted to be mounted around the usual shift shaft 4 (FIG. 5) such that the flat portion 54 of the D-shaped opening 50 seats against a flat surface 86 formed on the shift shaft 4, becoming interlocked therewith. The usual shift cable 2 is connected at one end thereof to the shift cable pin 37 and at the other end thereof to the usual gear shift lever 1 inside the vehicle.

In operation, with the nut 82 loosened, the lever member 12 reaches an equilibrium or "adjusted" position with respect to the force of the adjusting spring 62 and the length of the shift cable core 2, eliminating backlash and to compensate for vehicle built variable tolerances from the system. The nut 82 is then tightened against the flat surface 74 of the clamp washer 68, to clamp the latter against the arcuate edge portions 32 and 34 of the lever side walls 18 and 20 and, thereby, interlock the lever member 12 and the clamp plate 46 such that the entire assembly 10 thereafter moves as a unit.

Referring now to the alternate embodiment shown in FIGS. 8-13, a self-adjusting gear shift lever assembly 92 includes a block-like lever member a lever member 94 having parallel outer surfaces 96 and 98 (FIG. 8), with a D-shaped opening 100 formed through the lever member intermediate the surfaces 96 and 98. A split 102 is formed through the wall of the lever member 94 directly opposite the flat surface 104 of the D-shaped opening 100. A clamp screw 105 is extended through an opening 101 (FIG. 9) formed in a first segment 106 between the outer flat surface 96 and the split 102, and threadedly connected through a threaded opening 108 formed in a second segment 110 between the split and the opposite outer surface 98.

The segment 106 is extended outwardly a predetermined distance to terminate in an arcuate surface 112 (FIG. 8) substantially concentric with the opening 100. A spring mounting lug 114 is formed to extend outwardly from the body of the lever Member 94, effectively extending the outer flat surface 98 beyond the wall portion 116 adjacent the flat surface 104 of the D-shaped opening 100. A spring mounting pin 118 is secured in an opening 120 formed through the mounting lug 114 and extending adjacent the wall portion 116. A cylindrical extension 122 is formed on a side face 124 (FIG. 12) of the lever member 94, extending the D-shaped opening 100, with a still further flanged extension 126 formed on the outer edge of the cylindrical extension 122, extending the flat surface 104 laterally and having a flange portion 128 extending radially outwardly from the cylindrical extension 122 (FIG. 13) spaced apart from and parallel to the side face 124.

A clamp plate 130 is formed to include a body portion 132 (FIGS. 8 and 9) having a round opening 134 with a diameter slightly larger than the outside diameter of the cylindrical extension 122, and having a notch 136 formed adjacent the opening 134 adapted to permit mounting the clamp plate past the flange portion 128 (FIG. 8) and around the cylindrical extension 122, and then rotating same to assure that a wall segment of the body portion 132 is freely mounted intermediate the flange 128 and the side face 124 of the lever member 94 (FIGS. 12 and 13).

A first co-planar arm 138 having a bent end portion 140 (FIGS. 8 and 10) extending in a planar relationship from one half of one end of the body portion 132, extending beyond the segment 110. A combined rivet and shift cable pin 142 (FIG. 13) is secured in an opening 144 formed in the bent distal end portion 140 and extends outwardly therefrom on the side opposite the lever 94. A second bent arm portion 146 (FIG. 13) is bent to extend adjacent the arcuate end surface 112 of the segment 106. A longitudinal slot 148 (FIG. 13) is formed in the bent arm portion 146, and an adjustment lockscrew 150 is extended through the slot 148 and threadedly mounted in a threaded opening 152 (FIG. 8) formed in the arcuate surface 112.

A spring mounting finger 154 extends from the end of the body portion 132 of the clamp plate 130 opposite the second arm portion 146, and is bent to extend across the lever member 94 (FIG. 13). A spring mounting pin 156 (FIG. 9) extends from an edge of the finger 154 toward the spring mounting pin 118 of the lever member 94. A coil spring 158 (FIG. 9) is compressed between the two mounting pins 118 and 156, urging the finger 154 and lug 114 apart and, hence, the adjustment lockscrew 150 toward the end 160 (FIGS. 9 and 10) of the slot 148, i.e., away from the arm 138.

As with the gear shift lever assembly 10, the alternate gear shift lever assembly 92 is adapted to be mounted around the usual shift shaft 84 (FIG. 13) such that the flat surface 104 of the D-shaped opening 100 seats against the flat surface 86 formed on the shift shaft 4, becoming interlocked therewith. The usual shift cable 2 is connected at one end thereof to the shift cable pin 142 and at the other end thereof to the usual shift lever 1 inside the vehicle.

In operation, with the adjustment lockscrew 150 loosened and the clamping screw 105 tightened, the lever member 94 reaches its equilibrium or adjusted position with respect to the force of the spring 158 and the length of the shift cable 2, assuring that no backlash exists in the system. The lockscrew 150 is then tightened against the bent arm portion 146 of the clamp plate 130 to clamp the latter against the arcuate surface 112 of the segment 106 and, thereby, interlock the lever member 94 and the clamp plate 130 such that the entire assembly 92 thereafter moves as a unit.

Industrial Applicability

It should be apparent that the inventive automotive gear shift lever assembly provides an efficient apparatus for serving as a link in the shift cable connection between the transmission and the shift lever inside the vehicle for adjusting the shift cable while ensuring that no backlash will occur in the system.

While but two embodiments have been shown and described, other modifications thereof are possible within the scope of the following claims.

The embodiments of the invention in which an exclusive property or privilege is claimed are defined as follows:

What is claimed is:

1. For use with a transmission shift shaft, a self-adjusting gear shift lever assembly comprising a lever member having a first opening formed therethrough, a clamp plate relatively rotatably connected to said lever member and said clamp plate having a second opening formed therethrough and axially aligned with said first opening, one of said first and second openings being adapted to being fixedly mounted around said shift shaft, spring means for urging said lever member and said clamp plate rotatably apart, and fastener means for selectively interlocking said lever member and said clamp plate.

2. The self-adjusting gear shift lever assembly described in claim 1, wherein one of said first and second openings is substantially D-shaped for mounting on said shift shaft.

3. The self-adjusting gear shift lever assembly described in claim 2, and a remote gear shift lever, a shift cable pin formed on one of said lever member and said clamp plate, and a shift cable interconnected at the ends thereof with said shift cable pin and said remote gear shift lever assembly, said fastener means being fastened at the equilibrium point with respect to the force of said spring means and the length of said shift cable, thereby eliminating backlash from said gear shift lever assembly.

4. The self-adjusting gear shift lever assembly described in claim 3, wherein said D-shaped opening and said fastener means are formed on said clamp plate, said shift cable pin is formed on said lever Member means, and said spring means is a tension spring.

5. The self-adjusting gear shift lever assembly described in claim 3, wherein said D-shaped opening and said fastener means are formed on said lever member, said clamp plate having opening means formed through the distal end thereof for mounting said shift cable pin, and said spring means is a compression spring.

6. The self-adjusting gear shift lever assembly described in claim 4, wherein said lever member includes two spaced apart parallel walls having a predetermined space therebetween, said clamp plate being pivotally mounted in said space, spring mounting extensions formed on respective ends of said lever member and said clamp plate, said tension spring being connected between said extensions urging said extension on said clamp plate toward said extension on said lever Member to thereby rotate said clamp plate and said shift shaft so as to take the backlash out of said shift cable prior to fastening said fastener mean against said lever member.

7. The self-adjusting gear shift lever assembly described in claim 6, wherein said lever member includes arcuate edges formed o parallel walls adjacent said first opening; and said fastener means includes a threaded extension formed on said clamp plate on the end thereof opposite said spring mounting extension, an arcuate shaped clamp washer mounted around said threaded extension for Mounted for mounted against said arcuate edges of said lever member, and a nut threadedly mounted on said threaded extension for securing said clamp washer against said arcuate edges once said equilibrium point is reached.

8. The self-adjusting gear shift lever assembly described in claim 4, wherein said lever assembly includes a block-like lever member including said D-shaped opening, and a segment formed as an integral part of substantially one half of one end of said block-like lever member and terminating in an arcuate surface substantially concentric with said D-shaped opening, and a spring-mounting lug formed to extend from the other end of said block-like lever member diagonally opposite said segment, a cylindrical extension formed on one flat side face of said block-like lever member lengthening said D-shaped opening, and a flange portion extending from an edge of said cylindrical extension radially outwardly from said one flat side face of said D-shaped opening; said clamp plate being mounted around said cylindrical extension intermediate said flange portion and said one flat side face, and including an arcuate shaped bent arm portion extending across said arcuate surface of said segment, a longitudinal slot formed in said bent arm portion, said fastener means extending through said longitudinal slot and threadedly connected into said arcuate surface of said segment and a bent spring-mounting finger formed on the end of said clamp plate opposite said bent arm portion; and said spring means being compressed between said spring mounting lug and finger.

9. The self-adjusting gear shift lever assembly described in claim 8, and a co-planar arm on said clamp plate extending outwardly beyond said bent arm portion, and having an opening formed through the distal end thereof for mounting said shift cable pin.

10. The self-adjusting gear shift lever assembly described in claim 8, including a split formed in said block-like lever member adjacent said D-shaped opening opposite said one flat side face thereof, and a threaded fastener extended through an opening formed in said first mentioned segment adjacent said split and across said split and threadedly connected to said second segment adjacent said split.

11. The self-adjusting gear shift lever assembly described in claim 8, and a co-planar arm on said clamp plate extending outwardly beyond said bent arm portion, and said co-planar arm having an opening formed through the distal end thereof for mounting the shift cable pin.

* * * * *